(12) United States Patent
Ide

(10) Patent No.: US 7,978,422 B2
(45) Date of Patent: Jul. 12, 2011

(54) INCIDENT-LIGHT CONTROLLING APPARATUS

(75) Inventor: Takayuki Ide, Fussa (JP)

(73) Assignee: Olympus Corporation, Tokyo (JP)

( * ) Notice: Subject to any disclaimer, the term of this patent is extended or adjusted under 35 U.S.C. 154(b) by 165 days.

(21) Appl. No.: 12/204,312

(22) Filed: Sep. 4, 2008

(65) Prior Publication Data

US 2009/0073578 A1 Mar. 19, 2009

(30) Foreign Application Priority Data

Sep. 4, 2007 (JP) ................................ 2007-229129
Aug. 22, 2008 (JP) ................................ 2008-214191

(51) Int. Cl.
*G02B 9/08* (2006.01)
*G02B 13/00* (2006.01)
*G02B 5/22* (2006.01)

(52) U.S. Cl. ......... 359/738; 359/722; 359/739; 359/889

(58) Field of Classification Search .......... 359/738–739, 359/813–814, 824, 889, 230, 233–234, 236
See application file for complete search history.

(56) References Cited

U.S. PATENT DOCUMENTS 5,117,137 A * 5/1992 Kobayashi ................ 310/49.23
2005/0185241 A1* 8/2005 Johnson et al. ............... 359/227
2006/0152093 A1* 7/2006 Oishi et al. ...................... 310/36
2010/0044607 A1* 2/2010 Miki et al. ............... 251/129.11

FOREIGN PATENT DOCUMENTS

JP HEI 10-20360 1/1998

* cited by examiner

*Primary Examiner* — Jordan M. Schwartz
(74) *Attorney, Agent, or Firm* — Scully, Scott, Murphy & Presser, P.C.

(57) ABSTRACT

An incident-light controlling apparatus has a first aperture in a substrate, a diaphragm blade which rotates around an axis, and controls light passing through the first aperture, by the diaphragm blade rotating alternately between a first stationary position coinciding with the first aperture, and a second stationary position retracted from the first aperture, a permanent magnet joined directly to the diaphragm blade, at a position of the axis of rotation of the diaphragm blade, and magnetized in a direction of a plane of rotation of the diaphragm blade, and a pair of coils having a winding around cores disposed such that an end portion of each coil faces the magnet. The diaphragm blade rotated alternately between the first and second stationary positions due to an interaction between a generated magnetic field upon passing an electric power, and a magnetic field generated due to the magnet.

23 Claims, 8 Drawing Sheets

FIRST AXIS
SECOND AXIS
A
B
M
α/2
α
301
301c
401
402
403
404
201C
C
202
201
107
102
104

INCIDENT-LIGHT CONTROLLING APPARATUS

CROSS-REFERENCE TO RELATED APPLICATION

The present application is based upon and claims the benefit of priority from the prior Japanese Patent Application Nos. 2007-229129 filed on Sep. 4, 2007 and 2008-214191 filed on Aug. 22, 2008; the entire contents of which are incorporated herein by reference.

BACKGROUND OF THE INVENTION

1. Field of the Invention

The present invention relates to an incident-light controlling apparatus.

2. Description of the Related Art

In recent years, with an achievement of high image quality of a portable equipment having an image pickup function and a small size image pickup equipment such as a micro videoscope, with regard to optical elements such as a lens, an aperture, and an optical filter, there has been increasing demand for an application of a focusing lens, a variable aperture, and a variable characteristic filter instead of a conventional fixed focusing lens, a fixed aperture stop, and a fixed characteristic filter, and many proposals have been made as a method for making small optical elements to be used in a small size image pickup equipment.

As an example of such variable aperture, in Japanese Patent Application Laid-open Publication No. Hei 10-20360, a coil in which, a film of a substance having a substantial magnetic permeability is let to be a core, is formed on a printed board, with the substrate as a multi-layered substrate structure. A rotor having a hollow circular cylindrical shape which is magnetized at least to bipolarity is fitted in a coil body formed in such manner, and a blade member which adjusts an amount of light passing through is fixed to this rotor via shaft.

Moreover, without restricting to Japanese Patent Application Laid-open Publication No. Hei 10-20360, in a conventional technology, by a coil in which, core made of a magnetic body and a circular cylindrical shaped permanent magnet which is magnetized at least to bipolarity is subjected to winding, a rotational force is imparted to the permanent magnet.

However, in the invention disclosed in Japanese Patent Application Laid-open Publication No. Hei 10-20360, since a film of a substance having a substantial magnetic permeability is let to be the corer there is a magnetic attraction generated all the time between the permanent magnet and the core. For imparting a rotating force to the permanent magnet by passing an electric power to the coil in this state, it is necessary to reverse the magnetic force inside the core which is generated by the permanent magnet, and to create a magnetic pole of a opposite polarity at a coil end portion.

Normally, when a length of the core is sufficiently long, and when it is possible to secure a sufficient number of turns of the coil, by letting the structure to be such a structure, it is possible to use effectively the magnetic power which is generated by supplying the electric power to the coil. However, when it is necessary to make extremely small the incident-light controlling apparatus including the coil, it is difficult to achieve sufficient magnetic power by the core length and by passing the electric power to the coil.

SUMMARY OF THE INVENTION

The present patent application is made in view of the abovementioned circumstances, and an object of the present invention is to provide an incident-light controlling apparatus in which, it is possible to make small all the structural members by using a coil of extremely small size and by using the small structures.

To solve the abovementioned issues and to achieve the object, an incident-light controlling apparatus according to the present invention which has a first aperture formed in a substrate, and an incident-light controlling means which rotates around an axis of rotation as a center, and which controls light incident upon passing through the first aperture, by the incident-light controlling means rotating alternately between a first stationary position which coincides with the first aperture, and a second stationary position which is a position retracted from the first aperture, includes a permanent magnet which is joined directly to the incident-light controlling means, at a position of the axis of rotation of the incident-light controlling means, and which is magnetized in a direction of a plane of rotation of the incident-light controlling means, and a pair of coils, each having a winding around a core, and disposed such that an end portion of each coil is facing the permanent magnet.

The incident-light controlling means is rotated alternately between the first stationary position and the second stationary position by an interaction between a magnetic field which is generated due to a state of the coils upon passing an electric power, and a magnetic field which is generated due to the permanent magnet.

In the incident-light controlling apparatus of the present invention, it is preferable that a direction of magnetization of the permanent magnet and a direction of facing of the pair of coils are inclined while the incident-light controlling means is rotated from the first stationary position to the second stationary position.

In the incident-light controlling apparatus of the present invention, when an angle of rotation of the incident-light controlling means is let to be $\alpha$, and an axis which connects a center of the first aperture and an axis of rotation of the incident-light controlling means is let to be a first axis, and an axis which passes through the axis of rotation of the incident-light controlling means, and which is orthogonal to the first axis is let to be a second axis, it is desirable that in a state in which the incident-light controlling means is disposed at the first stationary position, the direction of magnetization of the permanent magnet is a direction in which, the incident-light controlling means has rotated through substantially $(\frac{1}{2})\alpha$ in a direction from the second stationary position to the first stationary position, with respect to the first axis, and the end portion of each coil is facing the permanent magnet from a direction of the second axis.

In the incident-light controlling apparatus of the present invention, it is preferable that the permanent magnet is formed to be circular cylindrical shaped, and the circular cylindrical shaped permanent magnet is used as a shaft of rotation of the incident-light controlling means by joining the circular cylindrical shaped permanent magnet directly to the incident-light controlling means.

In the incident-light controlling apparatus of the present invention, the core may be formed to be ring shaped having a part thereof chipped off, and may include a pair of coils wound at both end portions of the core, and a positioning portion which is formed at, at least, one location of the core, and a positioning receiving portion which is formed on the substrate, and the positioning portion and the positioning receiving portion may be engaged.

In the incident-light controlling apparatus of the present invention, it is desirable that the incident-light controlling means is a diaphragm blade having a second aperture which is smaller than the first aperture.

It is desirable that the incident-light controlling apparatus further includes a magnetic member which is orthogonal to a plane of rotation of the permanent magnet, and which is disposed to be in a state of being closed inside a surface involving the permanent magnet, and that the magnetic member is a frame member which involves the substrate, the incident-light controlling means, the permanent magnet, and the coil.

In the incident-light controlling apparatus of the present invention, it is preferable that the incident-light controlling means is an optical filter which limits a wavelength range or an amount of light which passes through. Moreover, it is desirable that the incident-light controlling means is an optical lens.

DETAILED DESCRIPTION OF THE INVENTION

Embodiments of an incident-light controlling apparatus according to the present invention will be described below in detail by referring to the accompanying diagrams. However, the present invention is not restricted by the following embodiments.

First Embodiment

A first embodiment will be described by using FIG. 1 to FIG. 4. In the first embodiment, an incident-light controlling apparatus in which, an incident-light controlling means is let to be a diaphragm blade is described as a concrete example. The incident-light controlling apparatus is applicable to a variable diaphragm apparatus.

Figure 1:
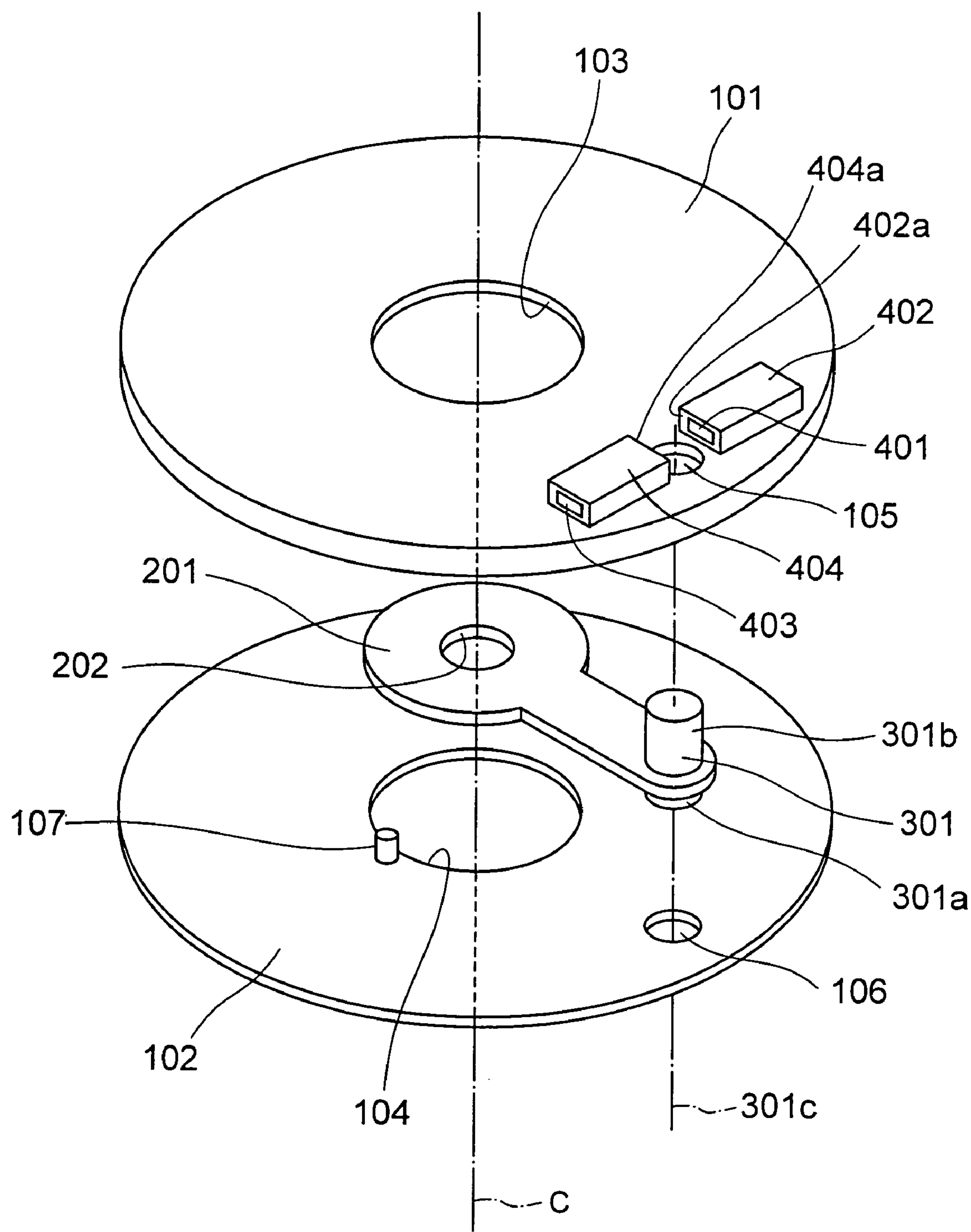
FIG. 1 is an exploded perspective view showing a structure of an incident-light controlling apparatus according to a first embodiment.

Firstly, a structure of the incident-light controlling apparatus of the first embodiment will be described below by using FIG. 1. FIG. 1 shows an exploded perspective view of the incident-light controlling apparatus. As shown in FIG. 1, the incident-light controlling apparatus includes a first substrate 102, a second substrate 101, a diaphragm blade 201, a permanent magnet 301, a coil 402, and a coil 404. A first aperture 104, a rotating shaft receiving hole 106, and a regulating pin 107 are formed in the first substrate 102. An aperture 103 having an aperture diameter not smaller than an aperture diameter of the first aperture 104, and a rotating shaft receiving hole 105 are formed in the second substrate 101. A second aperture 202 having an aperture diameter smaller than an aperture diameter of the first aperture 104 is formed in diaphragm blade (incident-light controlling means) 201. The permanent magnet 301 having a circular cylindrical shape is joined to the diaphragm blade 201 such that a central axis 301*c* coincides with a position of center of rotation. The pair of coils 402 and 404 with winding on cores 401 and 403 which are nonmagnetic bodies, are installed on the second substrate 101. The aperture 103 may have an aperture diameter same as the aperture diameter of the first aperture 104. Details of each structural element will be described below.

A central position of the first aperture 104 having a circular shape in a plan view formed in the first substrate 102 becomes an optical axis C. A center of the aperture 103 having the circular shape in a plan view of the second substrate 101 is positioned on the optical axis C. The regulating pin 107 is formed at a position at which, a central position of the second opening 202 having a circular shape in a plan view is formed in the diaphragm blade 201, with the diaphragm blade 201 in an abutting state.

The circular shaped permanent magnet 301 joined to the diaphragm blade 201 has a lower end portion 301*a* fittingly joined the rotating shaft receiving hole 106 formed in the first substrate 102, and an upper end portion 301*b* fittingly joined the rotating shaft receiving hole 105 formed in the second substrate 101. Accordingly, the diaphragm blade 201 is rotatable around the central axis 301*c* of the circular shaped permanent magnet 301 as a center of rotation. Moreover, the upper end portion 301*b* of the circular shaped permanent magnet 301 is disposed between end portions 402*a* and 404*a* of the pair of coils 402 and 402 installed to be facing, on the second substrate 101, and is protruded from the second substrate 101 to be facing each of the end portions 402*a* and 404*a*.

The pair of coils 402 and 404 has a winding around cores made of a nonmagnetic material such as a resin material and a nonmagnetic metal, and the end portions 402*a* and 404*a* are disposed to be facing mutually, sandwiching the permanent magnet 301 having a circular cylindrical shape. Magnetic poles generated by passing an electric power through the coils 402 and 404 are subjected to winding such that the magnetic poles have mutually opposite polarity all the time, at the end portions 402*a* and 404*a* facing the circular cylindrical shaped permanent magnet 301.

Figure 2:
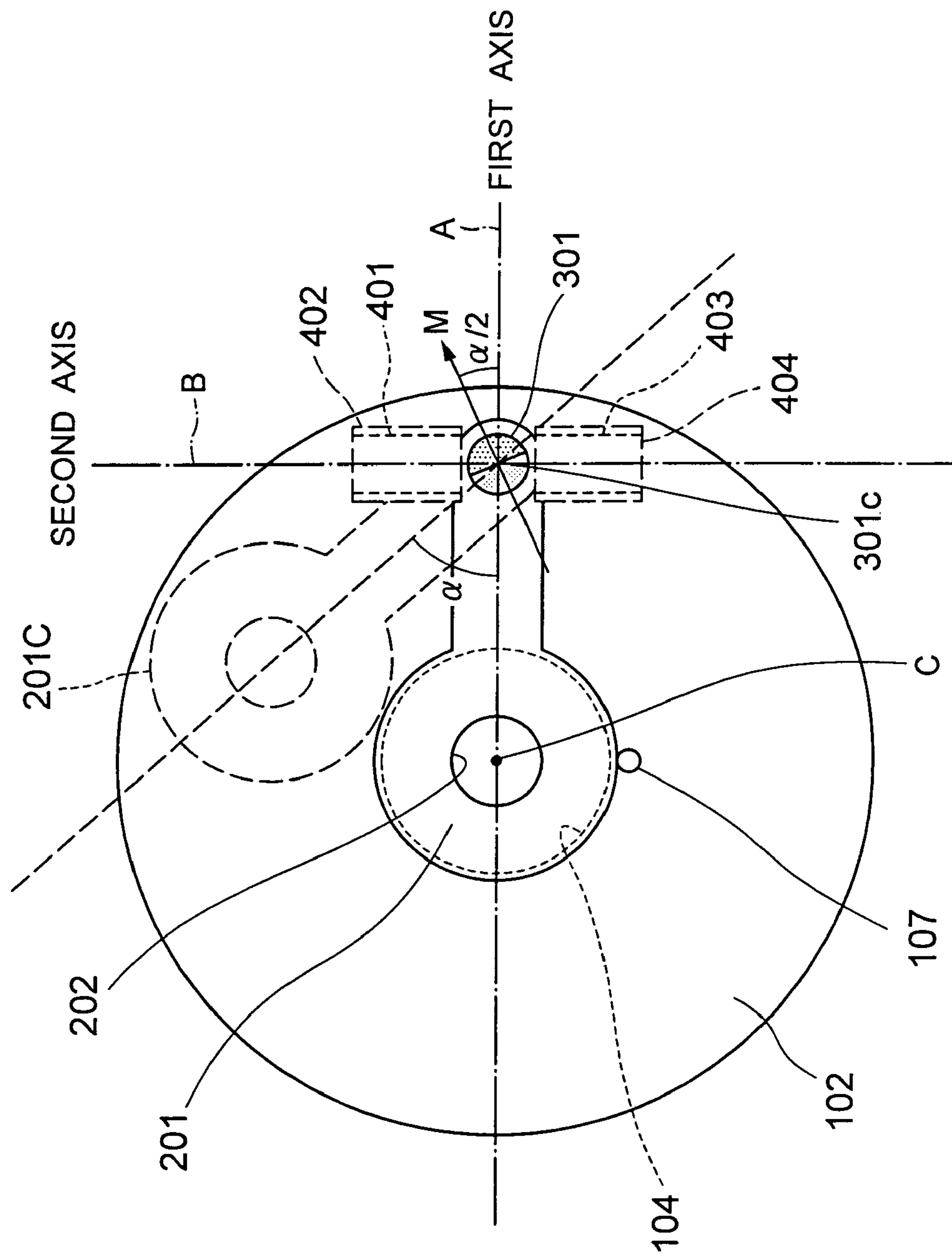
FIG. 2 is a plan view showing an operating state of the incident-light controlling apparatus according to the first embodiment.

Furthermore, by using FIG. 2, a desirable form of an arrangement of the pair of coils 402 and 404, and a direction of magnetization of the cylindrical shaped permanent magnet 301 is shown. Here, FIG. 2 is a plan view showing a movement of the diaphragm blade 201, and is a diagram in which the second substrate 101 is omitted. As shown in FIG. 2, in a state of an aperture of the incident-light controlling apparatus closed (the diaphragm blade 201 is shown by solid lines in the diagram: this state is let to be a first stationary state), and a state of an aperture of the incident-light controlling apparatus open (the diaphragm blade 201 is shown by dashed lines in the diagram: this state is let to be a second stationary state), when an axis connecting a center of the first aperture 104 formed in the first substrate 102 and the central axis 301*c* of the circular cylindrical shaped permanent magnet 301 is let to be a first axis A, an axis passing through the central axis 301*c* of the circular cylindrical shaped permanent magnet 301, and orthogonal to the first axis A is let to a second axis B, and an angle of rotating of the diaphragm blade 201 is let to be α, a direction of magnetization M of the circular cylindrical shaped permanent magnet 301 (direction from an S pole toward an N pole), in the first stationary state, is a direction in which, the diaphragm blade 201 has rotated through substantially (½)α in a counterclockwise direction in the diagram, with respect to the first axis A. The pair of coils 402 and 404 is disposed such that the end portions 402*a* and 404*a* thereof are facing in the direction of the second axis B with respect to the circular cylindrical shaped permanent magnet 301.

Figure 3:
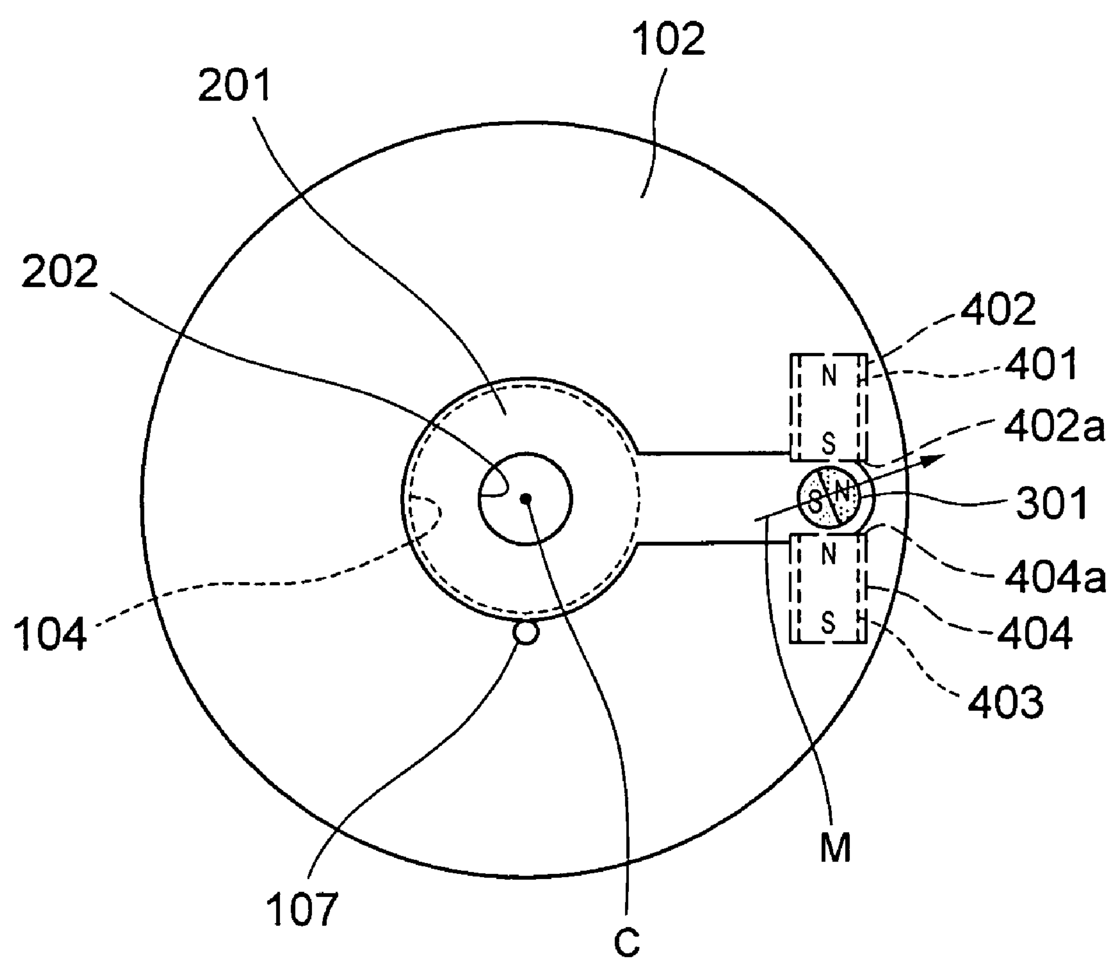
FIG. 3 is a plan view showing a state in which, an aperture of the incident-light controlling apparatus according to the first embodiment is narrowed.

Next, an operation of the incident-light controlling apparatus of the first embodiment will be described below by using FIG. 3 and FIG. 4. FIG. 3 is a plan view showing a state in which, the aperture of the incident-light controlling apparatus is narrowed, and the second substrate 101 is omitted in this diagram.

As shown in FIG. 3, when the direction of magnetization of the circular cylindrical shaped permanent magnet 301 is set such that a side near the first aperture 104 is let to be the S pole, and a side far from the first aperture 104 is let to be the N pole, by letting the end portion 402*a* of the coil 402, facing the circular cylindrical shape permanent magnet 301 to be the S pole, and the end portion 404*a* of the coil 404, facing the circular cylindrical shaped permanent magnet 301 to be the N pole, a rotating force in the anticlockwise direction in the diagram is generated in the circular cylindrical shaped permanent magnet 301, and the diaphragm blade 201 rotates to be abutting the regulating pin 107. At this time, center of the first aperture 104 and the second aperture 202 coincides with the optical axis C, and an aperture diameter of the incident-light controlling apparatus becomes same as a diameter of the second aperture 202 formed in the diaphragm blade 201.

Figure 4:
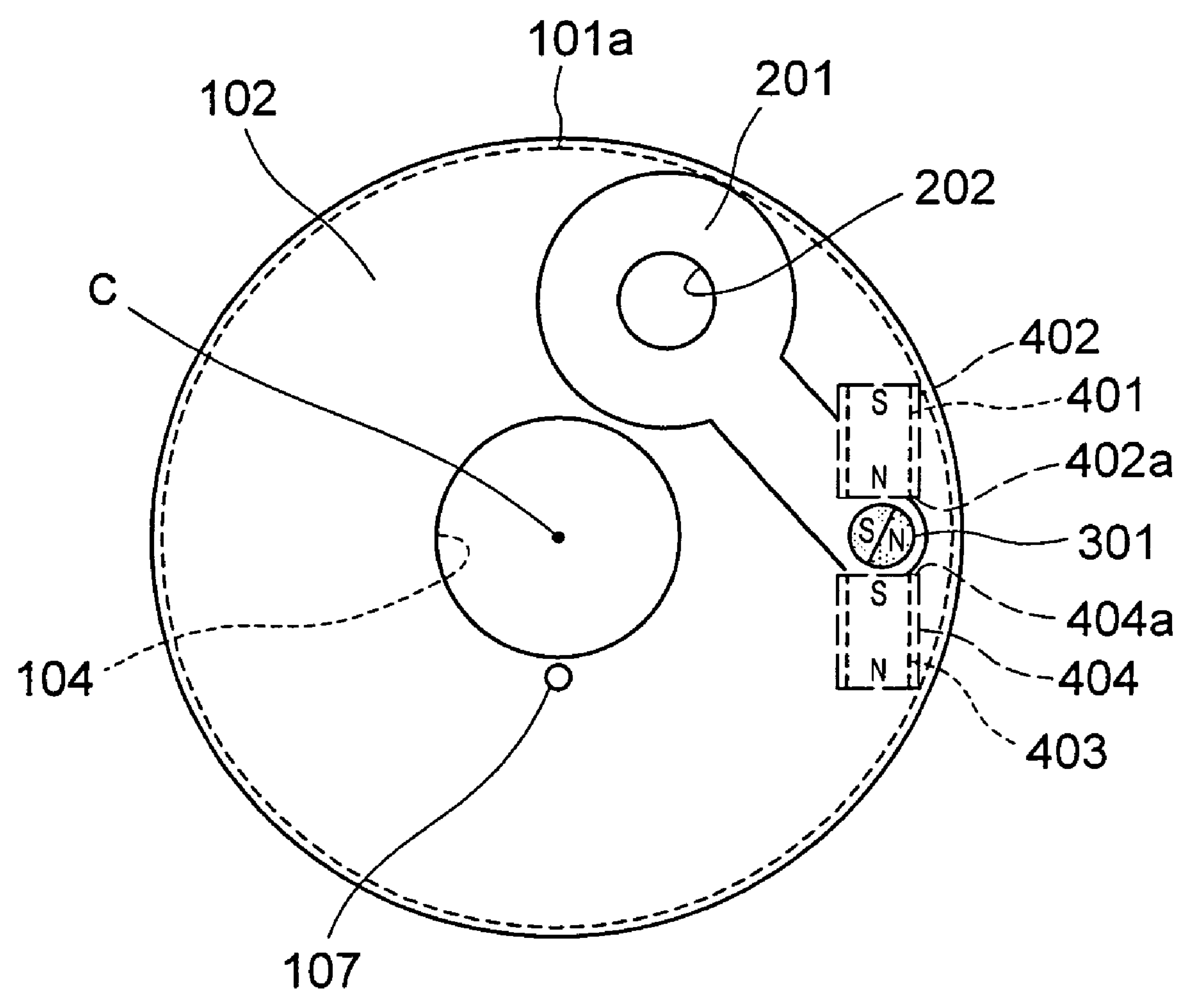
FIG. 4 is a plan view showing a state in which, the aperture of the incident-light controlling apparatus according to the first embodiment has opened.

FIG. 4 is a plan view showing a state in which, the aperture of the incident-light controlling apparatus is open, and the second substrate 101 is omitted in this diagram. By letting the end portion 402*a* of the coil 402, facing the circular cylindrical shaped permanent magnet 301 to be the N pole, and the end portion 404*a* of the coil 404, facing the circular cylindrical shaped permanent magnet 301 to be the S pole, a rotating force in a clockwise direction in the diagram is generated in the circular cylindrical shaped permanent magnet 301. Due to the torque generated in the permanent magnet 301, the diaphragm blade 201 is turned to a position retracted from the first aperture 104, and stops by abutting a side wall 101*a* formed along an outer peripheral surface on a lower surface of the second substrate 101. At this time, the aperture diameter of the incident-light controlling apparatus becomes same as a diameter of the first aperture 104 formed in the first substrate 102.

As it has been described above, while the diaphragm blade 201 is disposed upon being turned from the first stationary position to the second stationary position, since the direction of magnetization of the permanent magnet 301 and the direction facing the pair of coils 402 and 404 (the second axis B) are inclined all the time, the rotation of the diaphragm blade 201 becomes possible.

As shown in the first embodiment, since the cores of the pair of coils 402 and 404 are formed of a nonmagnetic material, when the electric power is not supplied to the coils 402 and 404, magnetic attraction is not generated between the coils 402 and 404, and the circular cylindrical shaped permanent magnet 301. Therefore, even when the magnetic field which is generated by supplying the electric power to the coils 402 and 404 is small, it is possible to impart the rotating force to the circular cylindrical shaped permanent magnet 301. Consequently, since it is possible to turn the diaphragm blade 201 even when the coil is made small, it is possible to realize a small size of the incident-light controlling apparatus.

As an example based on results of experiment carried out by inventors of the present invention, with respect to a permanent magnet of samarium cobalt of 1 mm ϕ, when a driving current of 100 mA was passed through a pair of coils having 100 turns of winding on a core made of a magnetic material, the permanent magnet could not be rotated. Whereas, by passing a driving current of 20 mA to a pair of coils having 80 turns of winding on a core made of a nonmagnetic material of the same permanent magnet, the permanent magnet could be rotated successfully.

Moreover, as shown in the first embodiment, by letting the circular cylindrical shaped permanent magnet 301 to be a member which becomes a shaft of rotation of the diaphragm blade 201, by forming the permanent magnet to be circular shaped, and joining directly to the diaphragm blade 201, it is possible to make the shaft member substantially thin, and to make small the incident-light controlling apparatus.

Figure 5:
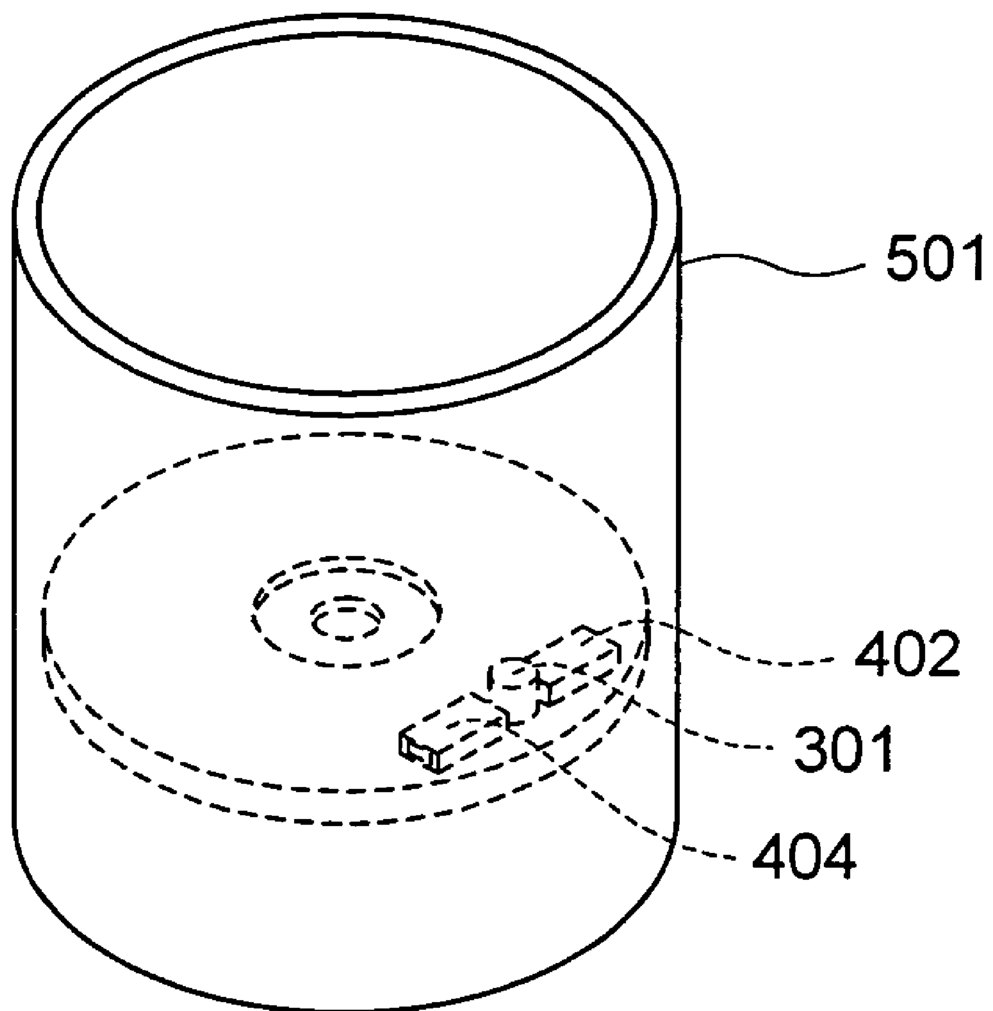
FIG. 5 is a perspective view showing a structure of an incident-light controlling apparatus according to a modified embodiment of the first embodiment.

Moreover, a modified embodiment of the first embodiment will be described below by using FIG. 5 and FIG. 6. As shown in FIG. 5, the incident-light controlling apparatus may be held by involving in a lens barrel 501 made of a magnetic body, or may be used commonly with a lens barrel holding an optical system other than the incident-light controlling apparatus, such as an optical lens and an optical filter.

The rotating force is generated in the diaphragm blade 201 by an interaction of a magnetic field which is generated from the circular cylindrical shaped permanent magnet 301 provided to the diaphragm blade 201, and a magnetic field which is generated from the pair of coils 402 and 404 disposed to be facing mutually, sandwiching the permanent magnet 301. Moreover, the direction of magnetization of the circular cylindrical shaped permanent magnet 301, the arrangement of the pair of coils 402 and 404, and the magnetic field which is generated due to the driving current flowing through each coil are set such that the rotating movement of the diaphragm blade 201 is optimum.

According to the abovementioned structure, when a magnetic field is generated from a peripheral equipment which generates the magnetic field, or an earth magnetism, there is a possibility that the diaphragm blade 201 do not exhibit the desired rotational movement. However, as shown in the modified embodiment of the first embodiment, by holding the incident-light controlling apparatus by the lens barrel 501 made of a magnetic material, there is no effect of an external magnetic field on an interior of the lens barrel 501. Therefore, it is possible to drive stably the incident-light controlling apparatus.

Figure 6:
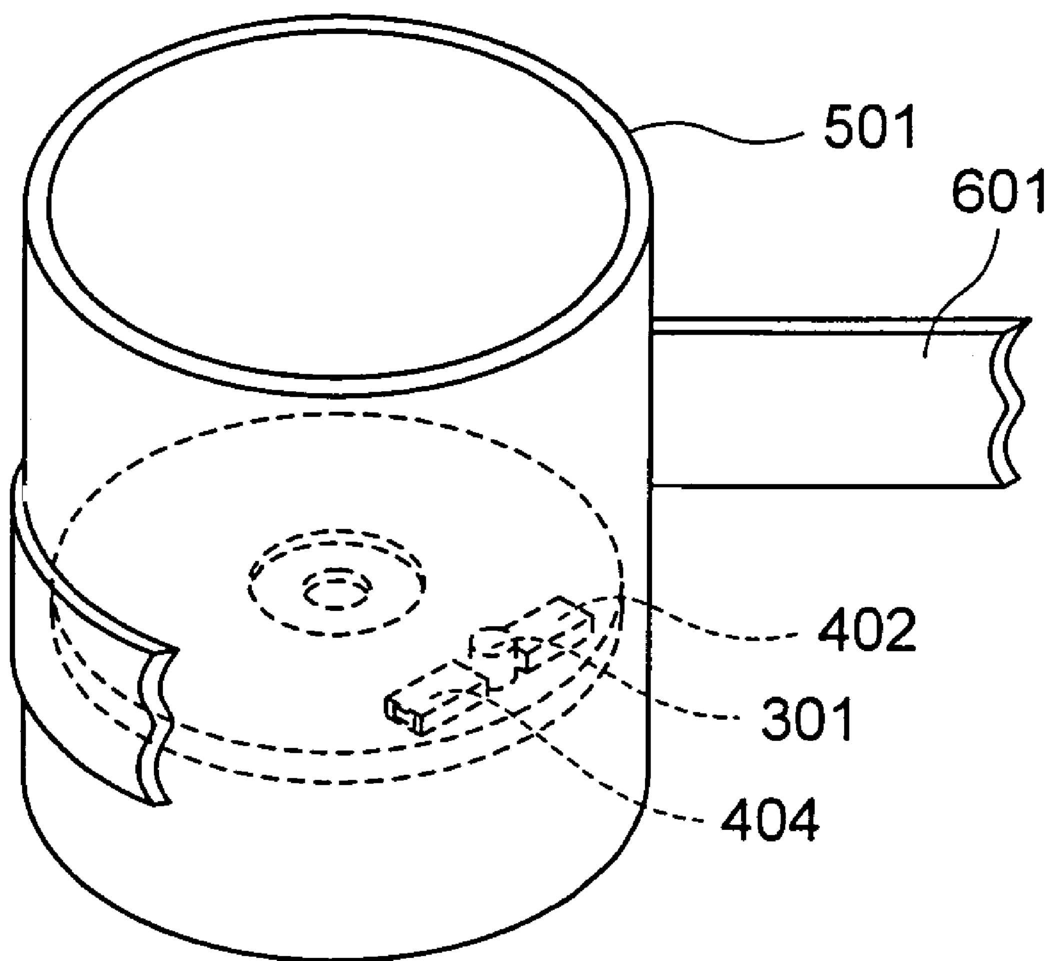
FIG. 6 is a perspective view showing a structure of the incident-light controlling apparatus according to the modified embodiment of the first embodiment.

Moreover, as another modified embodiment of the first embodiment, the incident-light controlling apparatus is involved in the lens barrel 501, and held as shown in FIG. 6. Furthermore, the structure may include a shield member 601 which is a magnetic member, at an outer periphery of a site at which, the lens barrel 501 holds the incident-light controlling apparatus. In this modified embodiment, the lens barrel 502 (501) is not required to be magnetic, and there is an advantage of an increased degree of freedom of designing as compared to the earlier modified embodiment.

In the first embodiment, and the modified embodiments of the first embodiment, the positioning at the second stationary position has been realized by abutting the side wall 101*a* formed on the second substrate 101. However, instead of the side wall 101*a*, a regulating pin similar to the regulating pin 107 may be provided on a lower surface of the second substrate 101.

Moreover, it is desirable that components such as the first substrate 102, the second substrate 101, and the diaphragm blade 201 are made of a nonmagnetic material.

Furthermore, by replacing the diaphragm blade 201 by an optical lens, it is also possible to use as an optical lens attaching and detaching apparatus.

Moreover, by replacing the diaphragm blade 201 by an optical filter, it is also possible to use as an optical filter attaching and detaching apparatus which changes a passing wavelength range or an amount of light passing through.

Second Embodiment

Next, a second embodiment of the present invention will be described below by using FIG. 7 and FIG. 8. In the second embodiment also, an incident-light controlling apparatus in which, the incident-light controlling means is let to be a diaphragm is described as a concrete example, similarly in the first embodiment. The structure of the first substrate 102 and the diaphragm blade 201 being similar to the structure in the first embodiment, the description and diagram of this structure are omitted. Same reference numerals are assigned to components having the same structure as in the first embodiment, and the description of such components is omitted.

A structure of the incident-light controlling apparatus of the second embodiment will be described below. FIG. 7 is a perspective view showing the structure of the incident-light controlling apparatus of the second embodiment. As shown in FIG. 7, the incident-light controlling apparatus of the second embodiment differs from the incident-light controlling apparatus of the first embodiment at a point that, the pair of coils 402 and 404 are formed at both ends of a core 405 made of a nonmagnetic material which is ring shaped having a part thereof chipped off, and a positioning portion 406 having a rectangular parallelepiped shape which has a rectangular parallelepiped hollow which becomes a positioning portion, is formed at a central portion of the core 405, and at a point that a positioning receiving portion 108 which is a rectangular parallelepiped protrusion is formed on the lower surface of the second substrate 101. A point that the end portions **402*a* and 404*a* of the pair of coils 402 and 404** are facing mutually is similar as in the first embodiment.

Figure 7:
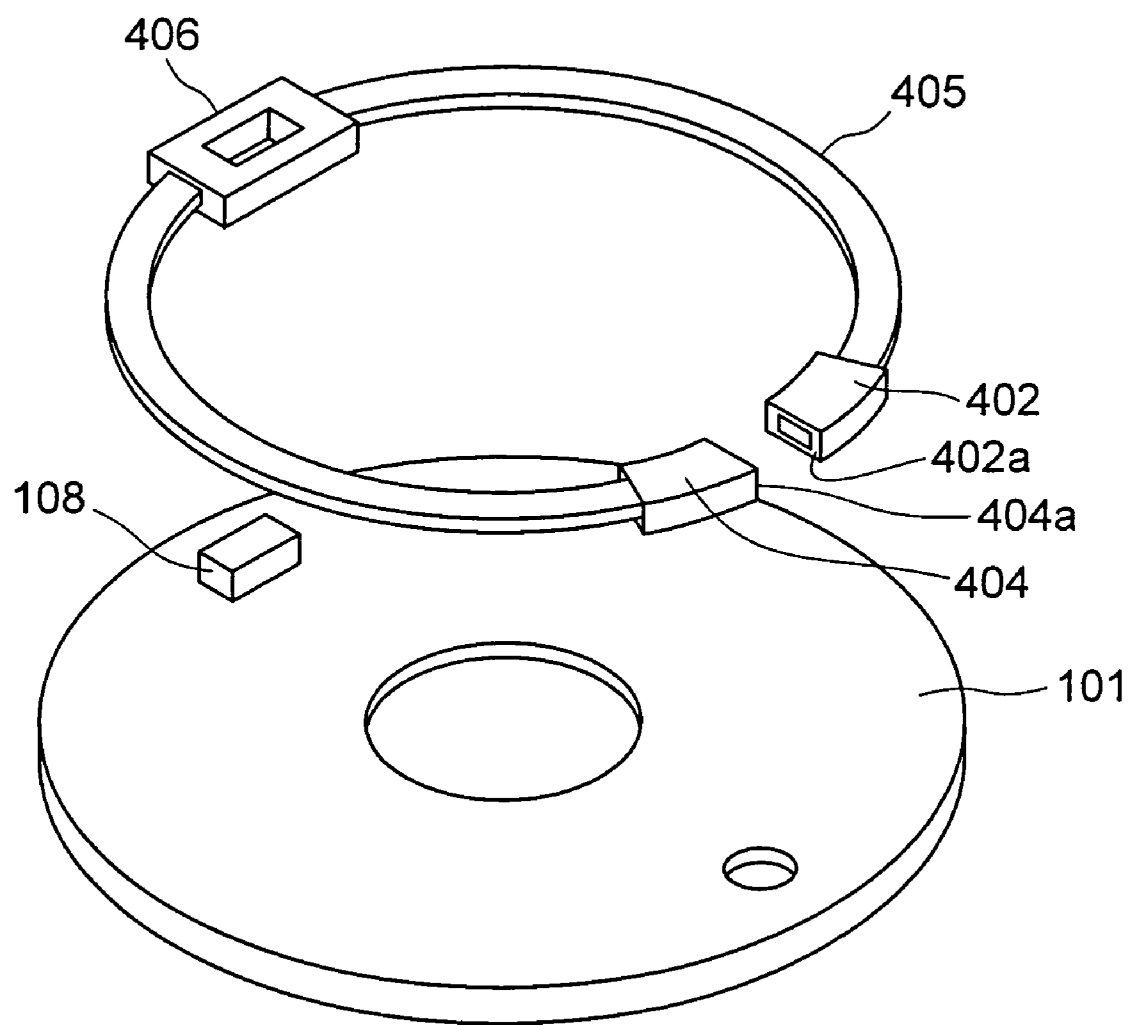
FIG. 7 is an exploded perspective view showing a structure of an incident-light controlling apparatus according to a second embodiment.

As shown in FIG. 7, when the positioning receiving portion 108 and the positioning portion 406 are fitted (are engaged) mutually, the end portions **402*a* and 404*a* of the pair of coils 402 and 404 are formed at positions, each facing the circular cylindrical shaped permanent magnet 301. Therefore, by fittingly joined and adhering the positioning receiving portion 108 and the positioning portion 406, it is possible to carry out easily the positioning of the pair of coils 402 and 404 with respect to the circular cylindrical shaped permanent magnet 301. The structure shown in FIG. 7** can also be similar for the modified embodiment of the first embodiment.

Figure 8:
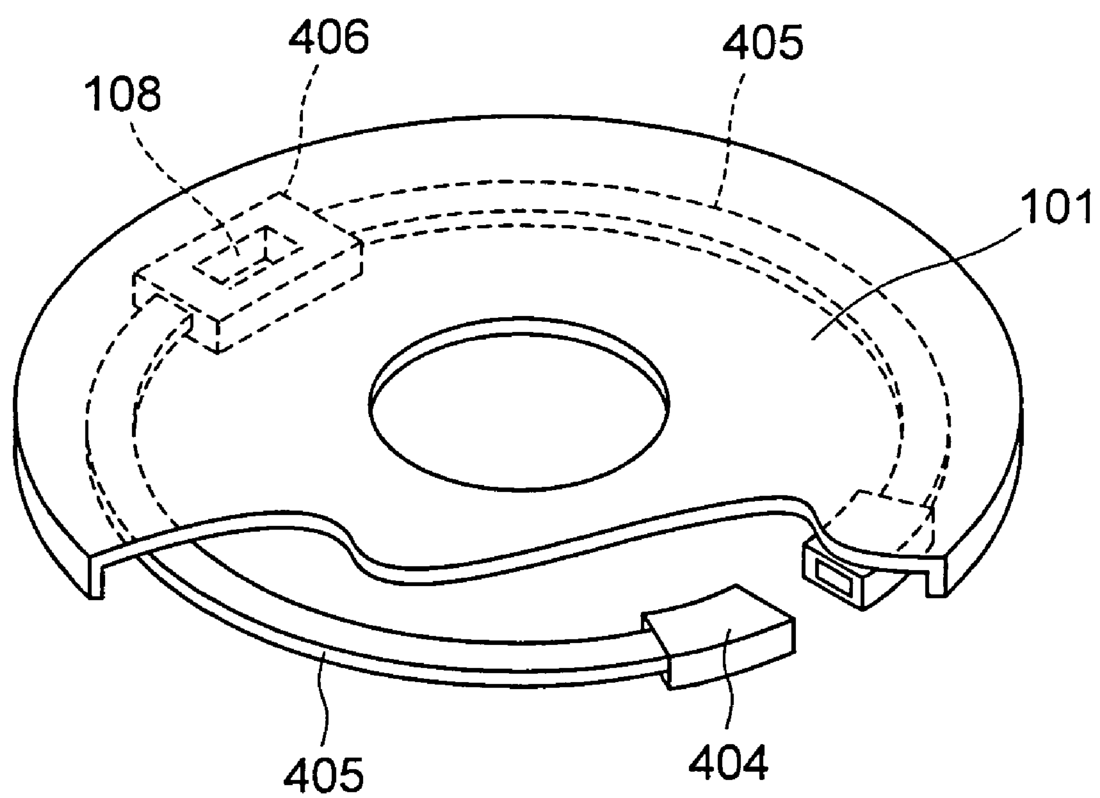
FIG. 8 is a perspective view showing a structure of an incident-light controlling apparatus according to a modified embodiment of the second embodiment.

Moreover, as shown in FIG. 8, the positioning receiving portion 108 may be formed at a lower portion of the second substrate 101, and the core 405 and the pair of coils 402 and 404 may be formed at a lower portion of the second substrate 101. Even in this case, the positioning receiving portion 108 and the positioning portion 406 are fittingly engaged mutually and adhered, and are fixed to the core 405. By letting the structure to be such structure, it is possible to carry out easily the positioning of the pair of coils 402 and 404 with respect to the circular cylindrical shaped permanent magnet 301, and to eliminate structural members to be disposed on an outer peripheral surface of the incident-light controlling apparatus. The structure shown in FIG. 8 can also be similar for the first embodiment.

It is needless to mention that, even in the second embodiment, by replacing the diaphragm blade by an optical lens, it is also possible to use as an optical lens attaching and detaching apparatus, similarly as in the first embodiment.

Moreover, it is needless to mention that, even in the second embodiment, by replacing the diaphragm blade by an optical filter, it is also possible to use as an optical filter attaching and detaching apparatus which changes the passing wavelength region or the amount of light passing through, similarly as in the first embodiment.

Third Embodiment

Next, a third embodiment of the present invention will be described below by using FIG. 1. In the third embodiment also, an incident-light controlling apparatus in which, the incident-light controlling means is let to be a diaphragm is a concrete example, similarly in the first embodiment and the second embodiment.

In the third embodiment, the pair of coils 402 and 404 are wound on a core made of a magnetic material. In the first embodiment, a nonmagnetic material has been used as the core of the coil. However, this is appropriate in a case in which, a magnet of a high residual magnetic flux density such as neodymium magnet or samarium cobalt magnet is used for the permanent magnet 301. On the other hand, in a case in which, a magnet having a comparatively lower residual magnetic flux density such as a ferrite magnet is used for the permanent magnet 301, it is appropriate to use a magnetic material as the core of the coil, as shown in the third embodiment.

As to whether using a magnetic material as the core of the coil is appropriate or using a nonmagnetic material as the core of the coil is appropriate is determined by the following conditions, according to a residual magnetic flux of the permanent magnet 301 and a magnetic flux which is generated by the coils 402 and 404.

(1) In a case in which, a nonmagnetic material is used for the core of the coil, when the residual magnetic flux of the magnet is equivalent to the magnetic flux generated in the coil, or when the magnetic flux generated in the coil is higher as compared to the residual magnetic flux of the magnet, it is possible to use both a magnetic material and a nonmagnetic material as the core of the coil.

(2) In a case in which, a magnetic material is used for the core of the coil, when the residual magnetic flux of the magnet is higher than the magnetic flux generated in the coil, a nonmagnetic material is used as the core of the coil.

(3) In a case in which, a magnetic material is used for the core of the coil, when the residual magnetic flux of the magnet is equivalent to or lower than the magnetic flux generated in the coil, a magnetic material is used as the core of the magnet.

As it has been described above, an incident-light controlling apparatus according to the present invention is suitable for an incident-light controlling apparatus which is used in a microvideoscope and other small size image pickup equipments.

The incident-light controlling apparatus according to the present invention shows an effect that it is possible to provide an incident-light controlling apparatus in which, it is possible make small all structural members by using an extremely small size coil.

What is claimed is:

1. An incident-light controlling apparatus having a first aperture formed in a substrate, and an incident-light controlling member that is substantially flat in its entirety and which rotates in its entirety around an axis of rotation as a center, and which controls light incident upon passing through the first aperture, by the incident-light controlling member rotating in its entirety between a first stationary position which coincides with the first aperture, and a second stationary position which is a position offset from the first aperture, the incident-light controlling apparatus comprising:

a permanent magnet which is joined directly to the incident light-controlling member, at a position of the axis of rotation of the incident-light controlling member, and which is magnetized in a direction of a plane of rotation of the incident-light controlling member; and a pair of coils, each having a winding around a core, and disposed such that, an end portion of each coil is facing the permanent magnet, wherein the incident-light controlling member is rotated about the axis of rotation between the first stationary position and the second stationary position by an interaction between a magnetic field which is generated due to a state of the coils upon passing an electric power, and a magnetic field which is generated due to the permanent magnet, the incident-light controlling member having a second aperture smaller than the first aperture, the second aperture through which passes a portion of the light incident upon the first aperture; wherein the permanent magnet is formed to be circular cylindrical shaped, and the circular cylindrical shaped permanent magnet is used as a shaft of rotation of the incident-light controlling member and the circular cylindrical shaped permanent magnet is joined directly to the incident-light controlling member.

2. The incident-light controlling apparatus according to claim 1, wherein a direction of magnetization of the permanent magnet and a direction of facing of the pair of coils are inclined while the incident-light controlling member is rotated from the first stationary position to the second stationary position.

3. An incident-light controlling apparatus having a first aperture formed in a substrate, and an incident-light controlling means which rotates around an axis of rotation as a center, and which controls light incident upon passing through the first aperture, by the incident-light controlling means rotating alternately between a first stationary position which coincides with the first aperture, and a second stationary position which is a position retracted from the first aperture, comprising:

a permanent magnet which is joined directly to the incident light-controlling means, at a position of the axis of rotation of the incident-light controlling means, and which is magnetized in a direction of a plane of rotation of the incident-light controlling means; and a pair of coils, each having a winding around a core, and disposed such that, an end portion of each coil is facing the permanent magnet;

wherein the incident-light controlling means is rotated alternately between the first stationary position and the second stationary position by an interaction between a magnetic field which is generated due to a state of the coils upon passing an electric power, and a magnetic field which is generated due to the permanent magnet;

a direction of magnetization of the permanent magnet and a direction of facing of the pair of coils are inclined while the incident-light controlling means is rotated from the first stationary position to the second stationary position; and when an angle of rotation of the incident-light controlling means is let to be $\alpha$, and an axis which connects a center of the first aperture and an axis of rotation of the incident-light controlling means is let to be a first axis, and an axis which passes through the axis of rotation of the incident-light controlling means, and which is orthogonal to the first axis is let to be a second axis, in a state in which, the incident-light controlling means is disposed at the first stationary position, the direction of magnetization of the permanent magnet is a direction in which, the incident-light controlling means has rotated through substantially $(\frac{1}{2})\alpha$ in a direction from the second stationary position to the first stationary position, with respect to the first axis, and the end portion of each coil is facing the permanent magnet from a direction of the second axis.

4. The incident-light controlling apparatus according to claim 3, wherein the permanent magnet is formed to be circular cylindrical shaped, and the circular cylindrical shaped permanent magnet is used as a shaft of rotation of the incident-light controlling means by joining the circular cylindrical shaped permanent magnet directly to the incident-light controlling means.

5. The incident-light controlling apparatus according to claim 4, wherein the core is formed to be ring shaped, having a part thereof chipped off, and includes a pair of coils wound at both end portions of the core, and a positioning portion which is formed at, at least, one location of the core, and a positioning receiving portion which is formed on the substrate, and the positioning portion and the positioning receiving portion are fittingly engaged.

6. The incident-light controlling apparatus according to claim 5, further comprising:

a magnetic member which is orthogonal to a plane of rotation of the permanent magnet, and which is disposed to be in a state of being closed inside a surface involving the permanent magnet.

7. The incident-light controlling apparatus according to claim 6, wherein the magnetic member is a frame member which involves the substrate, the incident-light controlling means, the permanent magnet, and the coil.

8. The incident-light controlling apparatus according to claim 7, wherein the incident-light controlling means is a diaphragm blade having a second aperture which is smaller than the first aperture.

9. The incident-light controlling apparatus according to claim 7, wherein the incident-light controlling means is an optical filter which limits a wavelength range or an amount of light which passes through.

10. The incident-light controlling apparatus according to claim 7, wherein the incident-light controlling means is an optical lens.

11. The incident-light controlling apparatus according to claim 6, wherein the magnetic member is a shield member which is fitted in a frame member which involves the substrate, the incident-light controlling means, the permanent magnet, and the coil.

12. The incident-light controlling apparatus according to claim 11, wherein the incident-light controlling means is a diaphragm blade having a second aperture which is smaller than the first aperture.

13. The incident-light controlling apparatus according to claim 11, wherein the incident-light controlling means is an optical filter which limits a wavelength range or an amount of light which passes through.

14. The incident-light controlling apparatus according to claim 11, wherein the incident-light controlling means is an optical lens.

15. The incident-light controlling apparatus according to claim 4, further comprising:

a magnetic member which is orthogonal to a plane of rotation of the permanent magnet, and which is disposed to be in a state of being closed inside a surface involving the permanent magnet.

16. The incident-light controlling apparatus according to claim 15, wherein the magnetic member is a frame member which involves the substrate, the incident-light controlling means, the permanent magnet, and the coil.

17. The incident-light controlling apparatus according to claim 16, wherein the incident-light controlling means is a diaphragm blade having a second aperture which is smaller than the first aperture.

18. The incident-light controlling apparatus according to claim 16, wherein the incident-light controlling means is an optical filter which limits a wavelength range or an amount of light which passes through.

19. The incident-light controlling apparatus according to claim 16, wherein the incident-light controlling means is an optical lens.

20. The incident-light controlling apparatus according to claim 15, wherein the magnetic member is a shield member which is fitted in a frame member which involves the substrate, the incident-light controlling means, the permanent magnet, and the coil.

21. The incident-light controlling apparatus according to claim 20, wherein the incident-light controlling means is a diaphragm blade having a second aperture which is smaller than the first aperture.

22. The incident-light controlling apparatus according to claim 20, wherein the incident-light controlling means is an optical filter which limits a wavelength range or an amount of light which passes through.

23. The incident-light controlling apparatus according to claim 20, wherein the incident-light controlling means is an optical lens.

* * * * *